US010454896B2

United States Patent
Soliman et al.

(10) Patent No.: US 10,454,896 B2
(45) Date of Patent: Oct. 22, 2019

(54) CRITICAL INFRASTRUCTURE SECURITY FRAMEWORK

(71) Applicant: iS5 Communications Inc., Mississauga (CA)

(72) Inventors: Tamer Soliman, Toronto (CA); Yuri Luskind, Thornhill (CA); Boris Tseitin, Maple (CA)

(73) Assignee: iS5 Communications Inc, Mississauga, ON ( * ) Notice: Subject to any disclaimer, the term of this patent is extended or adjusted under 35 U.S.C. 154(b) by 177 days.

(21) Appl. No.: 15/641,280

(22) Filed: Jul. 4, 2017

(65) Prior Publication Data

US 2019/0014085 A1    Jan. 10, 2019

(51) Int. Cl.
*H04L 29/06*    (2006.01)
(52) U.S. Cl.
CPC ........ *H04L 63/0263* (2013.01); *H04L 63/105* (2013.01); *H04L 63/0254* (2013.01); *H04L 63/0435* (2013.01); *H04L 63/08* (2013.01); *H04L 63/107* (2013.01); *H04L 63/1425* (2013.01); *H04L 63/162* (2013.01)
(58) Field of Classification Search
CPC ... H04L 63/0263; H04L 63/02; H04L 63/105; H04L 63/08; H04L 63/107; H04L 63/1425
See application file for complete search history.

(56) References Cited

U.S. PATENT DOCUMENTS

| 2007/0058638 | A1* | 3/2007 | Guichard | H04L 12/4641 370/395.31 |
| 2009/0213859 | A1* | 8/2009 | De Silva | H04L 12/4625 370/395.53 |
| 2011/0202675 | A1* | 8/2011 | Faulk, Jr. | H04L 63/02 709/238 |
| 2013/0044641 | A1* | 2/2013 | Koponen | H04L 12/66 370/255 |

(Continued)

OTHER PUBLICATIONS

Xu, Chenxi, and Ali Abur. "Robust state estimation via network partitioning." 2017 North American Power Symposium (NAPS). IEEE, 2017. (Year: 2017).*

(Continued)

*Primary Examiner* — Syed A Zaidi
(74) *Attorney, Agent, or Firm* — Fasken Martineau DuMoulin LLP (57) ABSTRACT

The present invention relates to an environmentally robust critical infrastructure security framework for network use in high demand or mission critical environments and applications, including but not limited to power stations, substations, intelligent transportation systems (ITS), rail, traffic control systems, chemical, oil & gas, critical manufacturing, and industrial applications is disclosed (e.g. complaint to most advanced industrial and military applications). The present invention provides a simple yet effective method suitable for critical infrastructure operations, their systems and protocol requirements. The framework includes role based access control (RBAC) down to each intelligent electronic device (TED), programmable logic controller (Continued)

(PLC), etc. regardless of the type of the device and without the need to have support at the IED level for specific requirements.

34 Claims, 3 Drawing Sheets

(56) References Cited

U.S. PATENT DOCUMENTS

| | | | | |
|---|---|---|---|---|
| 2014/0010109 A1* | 1/2014 | Himura | ............... | H04L 41/12 370/254 |
| 2014/0123212 A1* | 5/2014 | Wanser | ............... | H04L 63/10 726/1 |
| 2016/0050125 A1* | 2/2016 | Mattson | ............ | H04L 41/5051 709/225 |
| 2016/0328251 A1* | 11/2016 | Bernstein | ............... | G06F 9/455 |
| 2017/0026355 A1* | 1/2017 | Mathaiyan | ............ | H04L 63/08 |
| 2018/0102965 A1* | 4/2018 | Hari | ................... | H04L 45/16 |

OTHER PUBLICATIONS

Amin, Saurabh, Galina A. Schwartz, and Alefiya Hussain. "In quest of benchmarking security risks to cyber-physical systems." IEEE Network 27.1 (2013): 19-24. (Year: 2013).*
Avallone, Stefano, and Salvatore D'Antonio. "Using MPLS in a Wireless Mesh Network to Improve the Resiliency of SCADA Systems." International Conference on Mobile Lightweight Wireless Systems. Springer, Berlin, Heidelberg, 2010 (Year: 2010).*
Budka, Kenneth C., et al. "Communication network architecture and design principles for smart grids." Bell Labs Technical Journal 15.2 (2010): 205-227. (Year: 2010).*
Ratan Das and Mital Kanabar: Centralized Substation Protection and Control, IEEE PES Power, System Relaying Committee WG K15 Report, Dec. 2015. Available: htm://wwwpespsrc.org/Reports/ IEEE PES PSRC WG%20K15 Report CPC Dec 2015.pdf.
Meliopoulos et al. (2010): Substation of the Future: A Feasibility Study. PSERC Publication 10-17.
Looking into the Future Protection, Automation and Control Systems, WG K15 on Centralized Substation Protection and Control, IEEE Power System Relaying Committee, IEEE transactions, 2015.

* cited by examiner

CRITICAL INFRASTRUCTURE SECURITY FRAMEWORK

FIELD OF INVENTION

The present invention relates to critical infrastructure security framework for network use in high demand or mission critical environments and applications, including but not limited to power stations, sub-stations, intelligent transportation systems (ITS), rail, traffic control systems, chemical, oil & gas, critical manufacturing, and industrial applications. An environmentally robust security framework design is disclosed (e.g. complaint to most advanced industrial and military applications). The present invention provides a simple yet effective method suitable for critical infrastructure operations, their systems and protocol requirements. The framework includes role based access control (RBAC) down to each intelligent electronic device (IED), programmable logic controller (PLC), etc. regardless of the type of the device and without the need to have support at the IED level for specific requirements. The later helps extending security to legacy devices commonly coexisting in critical infrastructure application.

BACKGROUND TO THE INVENTION

Communication between computers, IEDs and other forms of internet of things (IoT) devices, etc. has become an important aspect of everyday life in private, industrial, and business environments. Data networks provide a medium for such communication and further for communication between various types of devices connected to the network such as servers, personal computers, workstations, IEDs, IoT devices, memory storage systems, or any other component capable of receiving or transmitting data to or from the network. The devices may communicate with each other using defined protocols that define the orderly transmission and receipt of information. In general, the elements view the network as a cloud to which they are attached and for the most part do not need to know the details of the network architecture such as how the network operates or how it is implemented. Ideally, any network architecture should support a wide range of applications and allow a wide range of underlying technologies. The network architecture should also work well for very large networks, be efficient for small networks, and adapt to changing network conditions.

Data networks can generally be differentiated based on their size. At the lower end, a local area network (LAN) describes a network having characteristics including multiple systems attached to a shared medium, high total bandwidth, low delay, low error rates, broadcast capability, limited geography, and a limited number of stations, and are generally not subject to post, telegraph, and telephone regulation. At the upper end, an enterprise network describes connections of wide area networks and LANs connecting diverse business units within a geographically diverse business organization.

To facilitate communication within larger networks, the networks are typically partitioned into subnetworks, each sharing some common characteristic such as geographical location or functional purpose, for example. The partitioning serves at least two purposes: (1) to break the whole network down into manageable parts; and (2) to logically (or physically) group users of the network. Network addressing schemes may take such partitioning into account and thus an address may contain information about how the network is partitioned and where the address fits into the network hierarchy.

There remains a need for a critical infrastructure security framework to ensure communication in-between elements are kept secure, confidentiality is maintained and access to critical assets (e.g. protection and control equipment such as, for example IEDs, PLCs, etc.) remains protected. Security in enterprise applications is mostly supported through appliances referred to as firewalls, whose main functions include filtering network traffic and applying configurable network security rules referred to as "firewall rules". The firewalled devices may be placed at a central location where traffic needs to be controlled, examined or reviewed, typically where a connection to the Internet exists, and apply security measures on a flow based approach referred to as the statefull firewall method. For industrial and critical infrastructure applications, the nature of the networks and security requirements are different then in the enterprise world which leads to the need for a new security frameworks.

Intrusion detection systems (IDS) may also be required to detect forms of security breaches or possible breaches by detecting anomalies in operation of the network, devices, etc. Although there are multiple solutions for IDS in the enterprise world, there remains a need to have specialized industrial IDS that provides the necessary functionality and security required by critical infrastructure protocols to avoid various cyber security threats, including but not limited to, cyber-attack patterns, and other threats.

SUMMARY OF THE INVENTION

Accordingly, it is an object of this invention to at least partially overcome some of the disadvantages of the prior art. Also, it is an object of this invention to provide an improved end-to-end security framework more suitable for industrial and critical infrastructure applications facilitating role based access control (RBAC) through the use of a centralized user credentials management application. A preferred framework of the present invention mandates authentication and/or authorization for users regardless of physical location (e.g. location agnostic), in other words, both local and remote users, prior to getting granted IP connectivity to critical infrastructure elements, yet facilitates accommodating critical L2 (none-L3) based protocols (e.g. Generic Object Oriented Substation Events (GOOSE)) across sites.

In a preferred embodiment, the framework may include L2 encryption across sites to provide a) secure communications over L2 network; b) accommodate critical L2 (none-L3) based protocols; c) an additional layer of security to protect from unauthorized access such as, for example, wiretapping or "man-in-the-middle" style attacks. The introduction of a functional (location agnostic) design approach separates critical infrastructure elements into functional groups; the functional groups spanning the entire network regardless of location. The approach of the present invention facilitates ease of use, practicality and effectiveness. In another preferred embodiment, the security framework of the present invention may address the standalone site operation requirements mandated by critical infrastructure applications through the use of fallback local authentication mode. In a preferred embodiment, the security framework of the present invention also may accommodate static clients facilitating access to applications similar but not limited to SCADA data acquisition servers, this represents a unique requirement for critical infrastructure operation.

An embodiment of the present invention is directed to a system for an end-to-end security framework in a mission critical infrastructure site, the system comprising: (a) an L3 level network partitioned into a plurality of L2 level networks based on functional purpose and connected through a plurality of firewall devices; (b) a control device provided in the mission critical infrastructure site connected to one of the plurality of L2 level networks; (c) an input device connected to one of the plurality of L2 level networks for allowing a user to request access to the control device by inputting user information into the input device; (d) a secure gateway device with dynamic firewall function managing access between the input device and the control device through applying dynamic firewall rules; (e) a credential management application connected to at least one of the plurality L2 networks having a role based access control protocol for granting access to the control device by analyzing the user information; and whereby the user can be granted access to the control device based on the analysis of the user information by the role based access control protocol of the credential management application.

A preferred embodiment of the present invention is directed to the system noted above wherein the secure gateway device is located in the mission critical infrastructure site.

Another preferred embodiment of the present invention is directed to the system noted above wherein the secure gateway device is located remote from the mission critical infrastructure site.

Yet another preferred embodiment of the present invention is directed to the system noted above wherein the credential management application is located in the mission critical infrastructure site.

Yet another preferred embodiment of the present invention is directed to the system noted above wherein the credential management application is located remote from the mission critical infrastructure site.

Another embodiment of the present invention is directed to an end-to-end security framework for a mission critical infrastructure having plurality of sites, the framework comprising: (a) a L3 level network partitioned into a plurality of L2 level networks; (b) a plurality of intelligent electronic devices connected through one of a plurality of L2 level networks to form a plurality of functional groups across the plurality of sites, at least one device being accessible to a user and at least one device being a secure gateway, wherein L2 connectivity between the plurality of the intelligent electronic devices within the same functional group is maintained across sites to accommodate critical infrastructure L2 protocol communications requirements and non-L3 critical infrastructure communication protocols yet restricting access through a role based authentication control protocol; (c) an input device connected to one of the plurality of the L2 level networks for allowing a user to request access to the control device by inputting user information into the input device; (d) a secure gateway device connected to one of the plurality of the L2 level networks for control access between the input device and the plurality of intelligent electronic devices; (e) a credential management application connected to one of the plurality of the L2 level networks having a role based access control (RBAC) protocol for granting access to each of the plurality of intelligent electronic devices by analyzing the user information; and whereby the user can be granted access to each of the plurality of intelligent electronic devices based on the analysis of the user information by the role based access control protocol of the credential management application.

Another embodiment of the present invention is directed to the above noted framework wherein each of the plurality of intelligent electronic devices are grouped based on functional purpose and connected through the secure gateway device.

Yet another embodiment of the present invention is directed to the above noted framework wherein the secure gateway device further comprises an authentication proxy function using role based access control authentication rules used to control access to the plurality of intelligent electronic devices.

Yet another embodiment of the present invention is directed to the above noted framework wherein the functional separation is based on application, control element, user role or managing authority jurisdiction.

Yet another embodiment of the present invention is directed to the above noted framework wherein user access to one of the plurality of intelligent electronic device is restricted across functional groups though access control function using dynamic firewall rules based on user credentials.

Yet another embodiment of the present invention is directed to the above noted framework wherein the L3 level network is part of a critical infrastructure.

Yet another embodiment of the present invention is directed to the above noted framework wherein one of the plurality of sites is a control room.

Yet another embodiment of the present invention is directed to the above noted framework wherein one of the plurality of L2 Level Networks is a SCADA or Operator Network Segment.

Yet another embodiment of the present invention is directed to the above noted framework wherein at least one of the plurality of L2 Level Networks is a SCADA network segment.

Yet another embodiment of the present invention is directed to the above noted framework wherein at least one of the plurality of L2 Level Networks is an Operator Network Segment.

Yet another embodiment of the present invention is directed to the above noted framework wherein the control room is provided with OT DMZ for OT partner access.

Yet another embodiment of the present invention is directed to the above noted framework further comprising a stateful firewall between the SCADA and Operator network segment.

Yet another embodiment of the present invention is directed to the above noted framework wherein the control room further comprises enterprise grade IDS.

Yet another embodiment of the present invention is directed to the above noted framework wherein the plurality of L2 Level Networks further comprise an antivirus, antispam or anomaly detection function.

Yet another embodiment of the present invention is directed to the above noted framework wherein the plurality of L2 Level Networks further comprises a SIEM platform for security monitoring.

Yet another embodiment of the present invention is directed to the above noted framework wherein the user authentication is conducted by a fallback mode supported on the secure gateway to facilitate site independent operation requirements for critical infrastructure sites.

Yet another embodiment of the present invention is directed to the above noted framework wherein the secure gateway utilizes dynamic firewall roles applied and removed based on RBAC according to user credentials.

Yet another embodiment of the present invention is directed to the above noted framework wherein a critical infrastructure protocol aware grade IDS monitors security.

Yet another embodiment of the present invention is directed to the above noted framework wherein the plurality of L2 Level Networks further comprises VLANs.

Yet another embodiment of the present invention is directed to the above noted framework wherein logical separation into functional groups uses device MAC address to restrict access to network ports to the specific intended device specially on the SCADA network segment and control room network segment.

Yet another embodiment of the present invention is directed to the above noted framework wherein an unused port on a device is put in disable or shut down mode with the exception of maintenance ports for which the appropriate VLAN needs to be configured for functional separation and maintaining security.

Yet another embodiment of the present invention is directed to the above noted framework wherein a static connection is created across functional groups.

Yet another embodiment of the present invention is directed to the above noted framework wherein the static connection can be accommodated through the use of static client mode.

Yet another embodiment of the present invention is directed to the above noted framework wherein L2 encryption is used between the first and second site while maintaining the L2 connectivity required to support non-L3 critical infrastructure communication protocols.

Yet another embodiment of the present invention is directed to the above noted framework further comprising a plurality of secure gateways to enhance the availability and reliability of the framework.

Yet another embodiment of the present invention is directed to the above noted framework wherein the secure gateways further comprise stateful firewalls to maintain security between the SCADA network segment and Operator network Segment.

Yet another embodiment of the present invention is directed to the above noted framework wherein the stateful firewalls enhance security between SCADA and OT DMZ.

Yet another embodiment of the present invention is directed to the above noted framework further comprising enterprise grade IDS system for anomaly detection and reporting.

Another embodiment of the present invention is directed to a method for implementing a security framework for mission critical infrastructure applications maintaining L2 connectivity across infrastructure sites, the method comprising: (a) partitioning an L3 level network into a plurality of L2 level networks based on functional purpose and connected through a plurality of firewall devices; (b) providing a control device in the mission critical infrastructure site connected to one of the plurality of L2 level networks; (c) allowing a user to request access to the control device through an input device connected to one of the plurality of L2 level networks, the user inputting user information into the input device; (d) managing access between the input device and the control device through a secure gateway device with dynamic firewall function applying dynamic firewall rules; (e) granting access to the control device through a credential management application connected to at least one of the plurality L2 networks analyzing the user information using a role based access control protocol; and whereby the user can be granted access to the control device based on the analysis of the user information by the role based access control protocol of the credential management application.

BRIEF DESCRIPTION OF THE DRAWINGS

In the drawings, which illustrate embodiments of the invention.

DESCRIPTION OF THE PREFERRED EMBODIMENTS

The description that follows, and the embodiments described therein, is provided by way of illustration of an example, or examples, of particular embodiments of the principles and aspects of the present invention. These examples are provided for the purposes of explanation, and not of limitation, of those principles and of the invention.

It should also be appreciated that the present invention can be implemented in numerous ways, including as a process, method, an apparatus, a system, a device or a method. In this specification, these implementations, or any other form that the invention may take, may be referred to as processes. In general, the order of the steps of the disclosed processes may be altered within the scope of the invention. The description that follows, and the embodiments described therein, is provided by way of illustration of an example, or examples, of particular embodiments of the principles and aspects of the present invention. These examples are provided for the purposes of explanation, and not of limitation, of those principles and of the invention.

It will be understood by a person skilled in the relevant art that in different geographical regions and jurisdictions these terms and definitions used herein may be given different names, but relate to the same respective systems.

A person skilled in the relevant art will understand that data networks can be described as having multiple layers with network ready devices (e.g. computers, mobile devices, software applications, etc.) connected thereto, communicating with each other using "peer-to-peer" protocols. The Open Systems Interconnection ("OSI") Reference Model provides a generalized way to view a network using multiple layers and is a convenient reference for mapping the functionality of other models and actual implementations. The distinctions between the layers in any given model is clear, but the implementation of any given model or mapping of layers between different models is not. For example, the standard promulgated by the Institute of Electrical and Electronics Engineers (IEEE) in its 802 protocols defines standards for LANs and its definitions overlap the bottom two layers of the OSI model.

As those of ordinary skill in the art will understand, intelligent electronic devices (IEDs) are generally considered to be networked microprocessor-based controllers of mission critical equipment, including, for example, power system equipment, such as circuit breakers, transformers, capacitor banks, etc. IEDs may also be referred to as network accessible devices, also known as control devices. These devices may receive data from sensors and power equipment, and may issue control commands, such as tripping circuit breakers if they sense voltage, current, or frequency anomalies, or raise/lower voltage levels in order to maintain the desired level.

As those of ordinary skill in the art would understand, the Internet is a global data network which comprises a vast number of computers, devices and data networks which are interconnected through communication links. A person skilled in the relevant art will understand that an electronic communications network of the present invention, may include, but is not limited to, one or more of the following: a local area network (LAN), a wide area network (WAN), an intranet, or the Internet (e.g. the Web, World Wide Web, etc.). The interconnected devices exchange information using various services, including, but not limited to, electronic mail, Gopher, web-services, application programming interface (API), File Transfer Protocol (FTP) In an example, a network allows a server computer system (a Web server) to send graphical Web pages of information to a remote client computer system. The remote client computer system can then display the Web pages via its web browser. Each Web page (or link) of the WWW is uniquely identifiable by a Uniform Resource Locator (URL). To view a specific Web page, a client computer system specifies the URL for that Web page in a request (e.g., a HyperText Transfer Protocol ("HTTP") request). The request is forwarded to the Web server that supports the Web page. When the Web server receives the request, it sends the Web page to the client computer system. When the client computer system receives the Web page, it typically displays the Web page using a browser. A web browser or a browser is a special-purpose application program that effects the requesting of web pages and the displaying of web pages and the use of web-based applications. Commercially available browsers include Microsoft Internet Explorer and Firefox, Google Chrome among others. It will be understood that with embodiments of the present invention, any browser would be suitable.

Web pages are typically defined using HyperText Markup Language ("HTML"). HTML provides a standard set of tags that define how a Web page is to be displayed. It will be understood that other languages, all well known in the art, may be used with the embodiment of the present invention. When a user indicates to the browser to display a Web page, the browser sends a request to the server computer system to transfer to the client computer system an HTML or other language document that defines the Web page. When the requested HTML document is received by the client computer system, the browser displays the Web page as defined by the HTML document. The HTML or other language document contains various tags that control the displaying of text, graphics, controls, and other features. The HTML document may contain URLs of other Web pages available on that server computer system or other server computer systems.

In any network model, a given layer communicates either with the same layer of a peer end station across the network, or with the same layer of a networked device or element within the network itself. A layer implements a set of functions that are usually logically related and enable the operation of the layer above it. Layer 1 ("L1"), the physical layer, provides functions to send and receive unstructured bit patterns over a physical link. The physical layer concerns itself with such issues as the size and shape of connectors, conversion of bits to electrical signals, and bit-level synchronization. More than one type of physical layer may exist within a network. Common types of Layer 1 are found within IEEE Standard 802.3 and FDDI (Fiber Distributed Data Interface). Layer 2 ("L2"), the data link layer, provides support for framing, error detecting, accessing the transport media, and addressing between end stations interconnected at or below layer 2. The data link layer is typically designed to carry packets of information across a single hop, i.e., from one end station to another within the same subnet, or LAN. Layer 3, the network layer, provides support for various higher functions as, for example, end to end addressing, network topological information, routing, packet fragmentation, etc. L3 may be configured to send packets along the best "route" from its source to its final destination. An additional feature of this layer is the capability to relay information about network congestion to the source or destination if conditions warrant. Networks frequently employ a combination of ISO Layer 2 and Layer 3 because of the success of the Internet and the increasing number of products and networks using the Internet. Specifically, in a typical Internet-associated network, designers combine an implementation in accordance with the IEEE 802 Standard (which overlaps ISO Layer 1 and Layer 2) with the Internet Protocol (IP) network layer.

A person skilled in the art will understand that the terms "L2" and "L3" refer to Layer 2 and Layer 3, respectively, and refer to communications components of a data network. The 'layers' refer to how one configures a network. Layer 2 is the data link where data packets are encoded and decoded into bits. The MAC (Media Access Control) sub layer controls how a computer on the network gains access to the data and permission to transmit it and the LLC (Logical Link control) layer controls frame synchronization, flow control and error checking. Layer 3 provides switching and routing technologies, creating logical paths, known as virtual circuits, for transmitting data from node to node. Routing and forwarding are functions of this layer, as well as addressing, internetworking, error handling, congestion control and packet sequencing. A layer 2 Data Link is responsible for physical addressing, error correction, and preparing the information for the media A layer 3 Network is responsible for logical addressing and routing IP, ICMP, ARP, RIP, IGRP, and routers.

Elements of the present invention may be implemented with devices that are well known in the art. A person skilled in the art will understand the term "device" to refer any networked, network ready or capable of being networked device, including but not limited to computers, mobile devices, portable devices, switches, IoT devices, and software applications. Generally speaking, devices such as computers include a central processor, system memory, and a system bus that couples various system components (typically provided on cards, including the system memory, to the central processor. A system bus may be any of several types of bus structures including a memory bus or memory controller, a peripheral bus, and a local bus using any of a variety of bus architectures. The structure of a system memory may be well known to those skilled in the art and may include a basic input/output system (BIOS) stored in a read only memory (ROM) and one or more program modules such as operating systems, application programs and program data stored in random access memory (RAM). Computers may also include a variety of interface units and drives for reading and writing data. A user or member can interact with computer with a variety of input devices, all of which are known to a person skilled in the relevant art. Computers can operate in a networked environment using logical connections to one or more remote computers or other devices, such as a server, a router, a network personal computer, a peer device or other common network node, a wireless telephone or wireless personal digital assistant. The computer of the present invention may include a network interface that couples the system bus to a local area network (LAN). Networking environments are commonplace in offices, enterprise-wide computer networks and home computer systems. A wide area network (WAN), such as the Internet, can also be accessed by the device. Devices can operate in a networked environment using logical connections to one or more remote computers or other devices, such as a server, a router, a network computer or mobile device, a peer device or other common network node, a wireless telephone or wireless personal digital assistant. The devices of the present invention may include a network interface that couples the system bus to a local area network (LAN). Networking environments are commonplace in offices, enterprise-wide computer networks and home computer systems.

Although the present specification describes components and functions implemented in the embodiments with reference to standards and protocols known to a person skilled in the art, the present disclosure as well as the embodiments of the present invention are not limited to any specific standard or protocol. Each of the standards for Internet and other forms of network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

Preferred embodiments of the present invention can be implemented in numerous configurations depending on implementation choices based upon the principles described herein. Various specific aspects are disclosed, which are illustrative embodiments not to be construed as limiting the scope of the disclosure. Although the present specification describes components and functions implemented in the embodiments with reference to standards and protocols known to a person skilled in the art, the present disclosures as well as the embodiments of the present invention are not limited to any specific standard or protocol.

A person skilled in the art will understand "mission critical" to refer systems or devices, components, equipment, personnel, processes, procedures, software, etc. associated therewith that are essential to operation or are in high demand environments. Failure or disruption of such mission critical systems or elements thereof will result in serious impact on operations. mission critical systems are the systems that essential to the business and operational safety. These are resilient systems with high degree of availability and performance matching stringent performance requirement. A person skilled in the art would understand that these are set out in various industrial standards, including, for example, AJJ standards 61850-3 etc.

Some portion of the detailed descriptions that follow are presented in terms of procedures, steps, logic block, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc. may be here, and generally, conceived to be a self-consistent sequence of operations or instructions leading to a desired result. The operations are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers or the like.

The present invention relates to electronic equipment (e.g. data transfer devices) and methods of using the same. More particularly, the present invention is directed to critical infrastructure security framework for network use in mission critical environments.

A person skilled in the relevant art will understand a web-based application refers to any program that is accessed over a network connection using HTTP, rather than existing within a device's memory. Web-based applications often run inside a web browser or web portal. Web-based applications also may be client-based, where a small part of the program is downloaded to a user's desktop, but processing is done over the Internet on an external server. Web-based applications may also be dedicated programs installed on an internet-ready device, such as a smart phone.

In the following specification, it will be understood by a person skilled in the relevant art that the term "user" refers to a person who or a software application that makes use of the authentication and authorization processes of the present invention and the term "user" shall refer to a user of the system recited herein. In some cases, the user is a member of a group (e.g. employee of a mission critical installation) with known access privileges as part of that membership.

It will be understood that the term "IED" is used to describe microprocessor-based controllers of power system equipment, such as circuit breakers, transformers and capacitor banks. IEDs receive data from sensors and power equipment, and can issue control commands, such as tripping circuit breakers if they sense voltage, current, or frequency anomalies, or raise/lower voltage levels in order to maintain the desired level. Common types of IEDs include protective relaying devices, on load tap changer controllers, circuit breaker controllers, capacitor bank switches, recloser controllers, voltage regulators etc.

It will be understood by a person skilled in the relevant art that the term "mobile device" or "portable device" refers to any portable electronic device that can be used to access a computer network such as, for example, the Internet (e.g. A network ready device). Typically a portable electronic device comprises a display screen, at least one input/output device, a processor, memory, a power module and a tactile man-machine interface as well as other components that are common to portable electronic devices individuals or members carry with them on a daily basis. Examples of portable devices suitable for use with the present invention include, but are not limited to, smart phones, cell phones, wireless data/email devices, tablets, PDAs and MP3 players.

It will be understood by a person skilled in the relevant art that the term "network ready device" or "internet ready device" refers to devices that are capable of connecting to and accessing a data network, such as, for example, the internet. A network ready device may assess the computer network through well-known methods, including, for example, a web-browser. Examples of internet-ready devices include, but are not limited to, mobile devices (including smart-phones, tables, PDAs, etc.), gaming consoles, and smart-TVs. It will be understood by a person skilled in the relevant art that embodiment of the present invention may be expanded to include applications for use on a network ready device (e.g. cellphone). In a preferred embodiment, the network ready device version of the software application may have a similar look and feel as a browser version but that is optimized to the device.

It will be further understood by a person skilled in the relevant art that the term "downloading" refers to receiving datum or data to a local system (e.g. mobile device, work station, laptop, etc.) from a remote system or to initiate such a datum or data transfer. Examples of a remote systems or clients from which a download might be performed include, but are not limited to, web servers, FTP servers, email servers, or other similar systems. A download can mean either any file that is offered for downloading or that has been downloaded, or the process of receiving such a file. A person skilled in the relevant art will understand the inverse operation, namely sending of data from a local system (e.g. mobile device) to a remote system is referred to as "uploading".

One skilled in the relevant art would appreciate that the device connections mentioned herein are for illustration purposes only and that any number of possible configurations and selection of peripheral devices could be coupled to the computer system.

It will be appreciated that the type of connections contemplated herein are exemplary and other ways of establishing a communications link between devices. The existence of any of various well-known protocols, such as TCP/IP, Frame Relay, Ethernet, FTP, HTTP and the like, is presumed, and computer can be operated in a client-server configuration to permit a user to retrieve and send data to and from a web-based server. Furthermore, any of various conventional web browsers can be used to display and manipulate data in association with a web based application.

The operation of the network ready device (e.g. mobile device, computer, work station, etc.) may be controlled by a variety of different program modules. Examples of program modules are routines, programs, objects, components, data structures, etc. that perform particular tasks or implement particular abstract data types. It will be understood that the present invention may also be practiced with other computer system configurations, including multiprocessor systems, microprocessor-based or programmable consumer electronics, network PCS, minicomputers, mainframe computers, and the like. Furthermore, the invention may also be practiced in distributed computing environments where tasks are performed by remote processing devices that are linked through a communications network. In a distributed computing environment, program modules may be located in both local and remote memory storage devices.

Embodiments of the present invention can be implemented by a software program for processing data through one or more devices (e.g. computer system). It will be understood by a person skilled in the relevant art that the computer system can be any device (e.g. personal computer, mobile device, notebook computer, server computer, mainframe, networked computer (e.g., router), workstation, software application and the like). The program or its corresponding hardware implementation is operable for providing user authentication and authorization. In one embodiment, the computer system includes a processor coupled to a bus and memory storage coupled to the bus. The memory storage can be volatile or non-volatile (i.e. transitory or non-transitory) and can include removable storage media. The computer can also include a display, provision for data input and output, etc. as will be understood by a person skilled in the relevant art.

Some portion of the detailed descriptions that follow are presented in terms of procedures, steps, logic block, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc. is here, and generally, conceived to be a self-consistent sequence of operations or instructions leading to a desired result. The operations are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers or the like.

It will be understood that in establishing a user interface, a task bar may be preferably positioned at the top of a screen to provide a user interface. Preferably, a textual representation of a task's name is presented in this user interface, preferably as a button, and the task names may be shortened as necessary if display space of the button is constrained. The labelled button having the task's name preferably operate as a type of hyperlink, whereby the user/viewer can immediately switch to the activity, view, etc. of an each of the tasks by selecting the button containing the applicable name from the task bar. In other words, the user or viewer is redirected by the application to that the function represented by the task button by selecting the labelled hyperlink. Preferably, the task entry associated with the currently-displayed work unit view may be shown in a different graphical representation (e.g., using a different color, font, or highlighting). In preferred embodiments, there may be provided a display having a selectable "X" in the task bar entry for each task: if the user clicks on the "X", then its associated task may be ended and the view of its work unit may be removed. A user interface may be web-based, application based, or a combination.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "creating," "providing," or the like refer to the actions and processes of a computer system, or similar device, including an embedded system, that manipulates and transfers data represented as physical (electronic) quantities within the computer system's registers and memories into other data similarly represented as physical quantities within the computer system memories or registers or other such information storage, transmission or display devices.

A person skilled in the relevant art will understand that the term "authentication" or to "authenticate" shall refer to the process or action of verifying the identity of a user or process based on credentials or other information (e.g. bioinformatics). For example, user authentication for each process ensures that the user or process attempting to access the desired system, method, process, etc. is, in fact, that specific user based on authentication policies enforced at the time of user authentication. A person skilled in the relevant art will understand that the term "authorization" or to "authorize" shall refer to the process or action of allowing an authenticated user, based on a predefined set of criteria (also referred to herein as "privileges"), access to the desired system, method, process, information, etc. When a server receives a user authentication request, the server first looks for any authorization policies or privileges that may be specified for that user. If there are specific authorization and/or authentication policies for that user, those policies are enforced for that particular user. It will be further understood that authentication and authorization may occur contemporaneously or at different times.

Embodiments of the present provide an improved "end-to-end" security framework for networked critical infrastructure applications that may facilitate credential based user access through a centralized use of authentication/authorization management applications. The security framework of the present invention may mandate authentication and authorization for both local and remote users prior to getting granted IP connectivity to critical infrastructure elements, yet facilitates accommodating critical L2 (none-L3) based protocols across sites (e.g. GOOSE). In a preferred embodiment, L2 encryption across sites facilitates secure communications over L2 accommodating critical L2 (none-L3) based protocols so as to provide an additional layer of security (e.g. to protect from wire-tapping, etc.). The introduction of a functional rather than location based (and which is, in fact, location agnostic) design approach separates critical infrastructure elements into functional groups. The functional groups may span the entire network regardless of location. The approach of the present invention facilitates ease of use, practicality and effectiveness. The security framework of the present invention may also address standalone site operation mandated by critical infrastructure applications through the use of a "fallback" local authentication mode. The security framework of the present invention also accommodate supervisory control and data acquisition (SCADA) servers permanent connections through the use of static users, a unique requirement for critical infrastructure operation. SCADA will be understood to be a universal means of centralized monitoring and control of a variety of local control devices, which could be from different manufacturers allowing access through standard automation protocols. It is one of the most commonly-used types of industrial control systems, however there are concerns about SCADA systems being vulnerable to cyber-warfare/cyberterrorism attacks. The chances of such breaches may be reduced by the present invention.

In a preferred embodiment of the present invention, the functional groups may span the entire network. In a further preferred embodiment, the functional groups are connected without regard to location (e.g. location agnostic). The functional separation achieved in the preferred embodiments of the present invention, such, as, for example, through the use of VLANs, provide that functional groups are separated to a granularity level suggested by the criticality of the operation and/or the security level assurance required. Functional design also includes roles as functions, an example is the introduction of a maintenance VLAN spanning the entire network regardless of location. Device to device communication within the same functional group takes place directly. Access across functional groups may be restricted, even locally, and only allowed through a dynamic firewall function.

Communication between different functional groups (such as, for example, a maintenance VLAN to a SCADA VLAN) takes place through a dynamic firewall facilitating on demand connections based on authentication and authorization privilege level. Dynamic (or local) firewall devices are located at each physical location at the SCADA LAN level. Authentication is required between functional groups even within the same physical location so as to allow logging of all access attempts even if locally performed. The end-to-end security environment of the present invention may utilize an authentication and authorization proxy; the authentication and authorization proxy functions may validate user credentials through a centralized authentication/authorization management platform (e.g. password based, biometric based, etc.), which can be provided on a centralized authentication/authorization (e.g. password) management server. Firewall rules may be dynamically applied to allow user access based on specific predetermined user attributes or user privileges (e.g. user authorization) determined through the use of a centralized (stored in the centralized password management server) password management server to provide successful user authentication. In a preferred embodiment, the user authorization privilege level defines the range of devices the user can have access to through the site local dynamic firewall based on their authentication/authorization credentials and returned user attributes or privileges.

Another aspect of the present invention provides a fall back mode for the centralized authentication server wherein the function thereof may be provided by a local authentication/authorization database that may be defined at a location dynamic firewall level, should, for example, the connection to the centralized password management server be interrupted. This can facilitate a stand alone site operation should the connection to the control room or neighboring sites get lost. A Static client mode is also defined through the dynamic firewall to facilitate static connections with control room servers, a requirement mandated by most critical infrastructure applications. Restricting access at the port level to the functional elements defined may also be provided for to the end-to-end security solution of the present invention, the use of MAC address database can be an example for access restriction at the port level In a preferred embodiment of the present invention, unused and not-functionally-assigned ports may be blocked or disabled. L2 Encryption across sites facilitates secure communications over L2 accommodating critical L2 based protocols providing an additional layer of security. Unused ports may be put in disable or shut down mode with the exception of maintenance ports for which the appropriate VLANs can be configured for functional separation and maintaining security.

As will be understood by a person skilled in the relevant art, VLANs may not provide adequate security, particularly in the context of mission critical applications. As such, additional security measures need to be applied to VLANs.

Accordingly, an aspect of this invention is to at least partially overcome some of the disadvantages of the prior art. Also, it is an aspect of this invention to provide an improved an end-to-end security framework more suitable for industrial and critical infrastructure applications facilitating role based access control (RBAC) through the use of a centralized user credentials management application. In a preferred embodiment of the present invention, an end-to-end security framework is provided that mandates authentication for both local and remote users (e.g. location agnostic) prior to getting granted internet protocol ("IP") connectivity to critical infrastructure devices, yet facilitates accommodating critical L2 (none-L3) based protocols across sites (e.g. Generic Object Oriented Substation Events ("GOOSE")). In a preferred embodiment, the framework may include L2 encryption across sites to provide a) secure communications over L2 network; b) accommodate critical L2 (none-L3) based protocols; and c) an additional layer of security to protect from unauthorized access such as wire-tapping or man-in-the-middle style attacks. This approach of the embodiments of the present invention facilitates ease of use, practicality and effectiveness. In a preferred embodiment, the security framework of the present invention may address the standalone site operation requirements which maybe mandated for critical infrastructure applications through the use of a fallback local authentication mode. In a further preferred embodiment, the end-to-end security framework also may accommodate static clients facilitating access to applications similar but not limited to SCADA data acquisition servers, a unique requirement for critical infrastructure operation. In the End-to-End Security Framework of the present invention, facilitation of a permanent connection to accommodate applications as SCADA data acquisition servers can be accommodated with the use of static client mode or a similar technique.

Another aspect of the present invention comprises using a technological method to achieve the required functional separation through, such as, for example, the use of VLANs. Functional groups may be categorized and/or separated (e.g. logically or physically) based on several factor, including, but not limited to, the security assurance level required, the nature of the operation, the location function, the facilities location, the criticality of the operation, etc.

Yet another aspect of the current invention comprises including roles as functions in the functional design, including, as an example of which, is the introduction of one or more maintenance VLANs spanning the entire network, regardless of location. As used herein, a person skilled in the art will understand a maintenance VLAN as a VLAN used by personnel authorized to perform maintenance functions on the network.

Yet another aspect of the current invention comprises device to device communication within the same functional group, take place directly without the need for authentication or authorization through the centralized or localized authentication/authorization (e.g. password) management server.

Yet another aspect of the current invention can provide a restriction of access across functional groups, even when the devices may be in the same physical location. Access across functional groups may be allowed only through routing and dynamic firewall functions.

Yet another aspect of the current invention comprises that communication between different functional groups (for example, a Maintenance VLAN communicating with a SCADA VLAN) takes place through a dynamic firewall function facilitating on demand connections based on authentication and authorization privilege level.

Yet another aspect of the current invention comprises the availability of devices (e.g. physical devices and/or software applications) providing the dynamic firewall functionality at each site that is required to be secured under cybersecurity measures. Such devices are often referred to as Site Secure Gateway (SG) devices.

Yet another aspect of the current invention comprises requires authentication between functional groups even within the same physical location (e.g. allows logging of all access attempts even if locally performed)

Yet another aspect of the current invention comprises an end-to-end security approach utilizing an authentication proxy ("AP") function, the authentication proxy function validates user credentials through the use of a centralized authentication/authorization (e.g. password) management platform or server. Firewall rules are dynamically applied to allow user access based on the attributes returned by the centralized authentication/authorization (e.g. password) management server upon successful authentication and/or authorization.

Yet another aspect of the current invention comprises user role based authorization privilege levels to define the range of assets (e.g. devices) the user can have access to through the site local dynamic firewall based on their credentials and returned attributes.

Yet another aspect of the current invention comprises the definition of a fall back mode to a local authentication database at the location dynamic firewall level should the connection to the centralized authentication/authorization (e.g. password) management server be interrupted.

Yet another aspect of the current invention comprises the availability of a Static Client mode, defined through the dynamic firewall to facilitate static connections with control room servers, a requirement which may be mandated by critical infrastructure applications.

Yet another aspect of the current invention comprises restricting access at the port level to the functional elements (e.g. devices) defined to the end to end security solution. An example to the use of MAC whitelisting.

Yet another aspect of the current invention comprises ensuring that unused and not-functionally-assigned ports are blocked or disabled.

Yet another aspect of the current invention comprises the use of L2 Encryption across sites to facilitate secure communications over L2 accommodating critical L2 based protocols, an additional layer of security.

Yet another aspect of the current invention comprises of introducing the concept of OT DMZ to facilitate third party OT access yet reducing critical infrastructure exposure, a concept similar to IT DMZ. The OT DMZ provided limited OT access to third party through OT DMZ servers logically separated from SCADA and critical infrastructure components through stateful firewall functions.

Yet another aspect of the current invention comprises the introduction of SCADA Operator Network Segment separated from the SCADA LAN through the use of routing and/or firewall functions, in order to add yet another layer of security. In the End-to-End Security Framework of the present invention, Stateful Firewall function can be used to enhance security between SCADA and Operator Network Segments. Stateful Firewall function can also be used to enhance security between SCADA and OT DMZ. In the End-to-End Security Framework of the present invention, security monitoring can be enhanced by the introduction of enterprise grade IDS system for anomaly detection and reporting.

The present invention provides an end-to-end security framework for critical infrastructure applications by providing functional separation of devices and/or users based on application, control element (type and/or criticality to operation), user role or function and managing authority jurisdiction. Secure Gateways (SG) (site or control room) may be used as access control devices with an authentication proxy, such as, for example, a centralized or localized credential management application to provide security through restricting access between function groups yet maintain L2 connectivity across sites to accommodate critical infrastructure protocol requirements.

The present invention may also provide an end-to-end security framework for critical infrastructure applications and/or control room by providing a control room with function separation between SCADA and Operator Network Segments, OT DMZ for OT third party partner access (e.g. regional or national authorities accessing SCADA and/or metering data), Stateful Firewall between SCADA and Operator Network Segment, Enterprise Grade IDS at control room level, Antivirus, Anti-Spam and anomaly detection, and SIEM platform for security monitoring.

In a preferred embodiment of the present invention, facilitation of site independent operation is accomplished by the use of a fall back mode supported on secure gateway devices. The secure gateway device, and/or function may also utilizes dynamic firewall roles applied and removed based on RBAC according to user credentials. A critical infrastructure protocol aware grade IDS may be provided to monitor security after implementation The present invention may also provide VLANs as means of accomplishing the logical network separation between functional group. Locking down access to communications equipment using MAC address is preferred, especially on SCADA and control VLANs.

Figure 1:
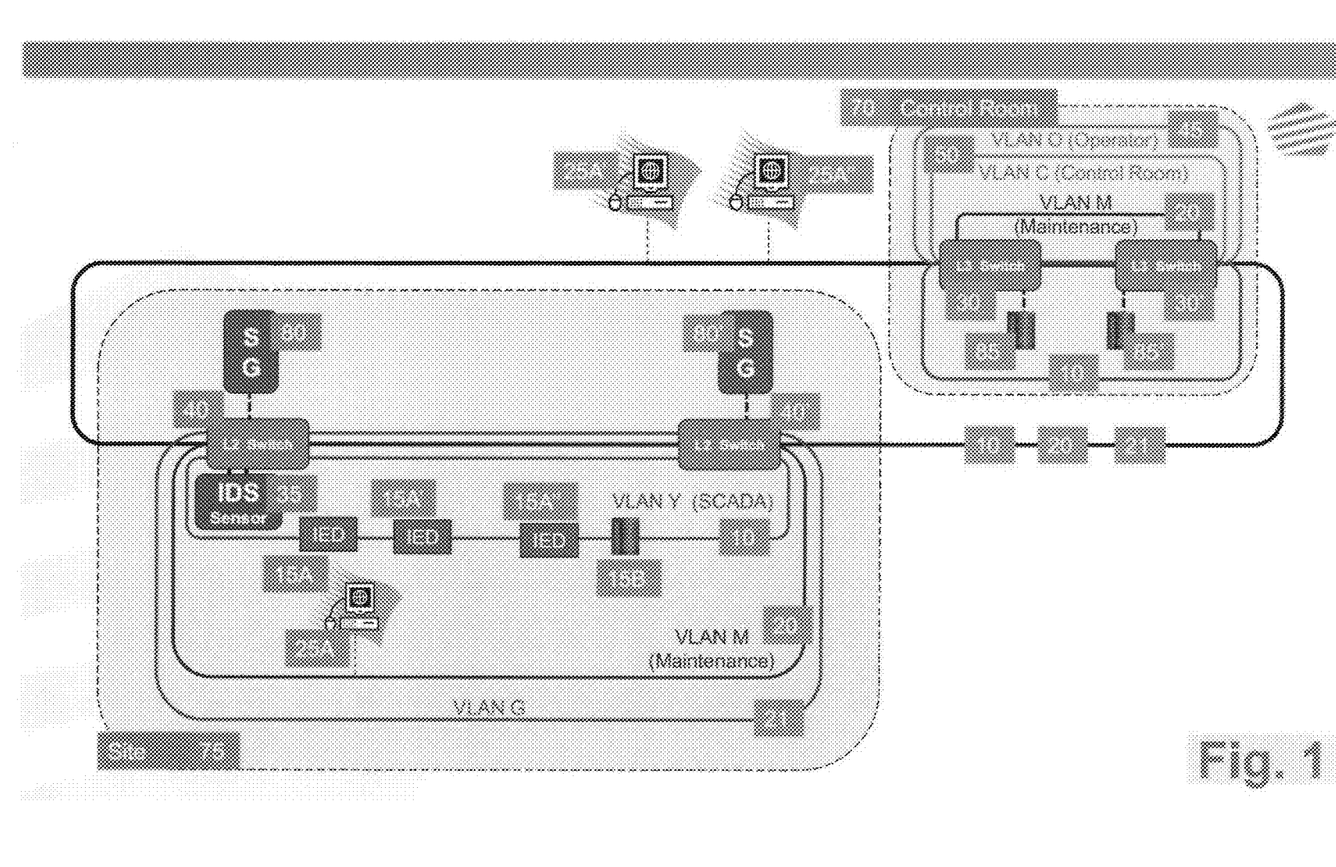
FIG. 1 provides a preferred embodiment of the present invention.
Figure 2:
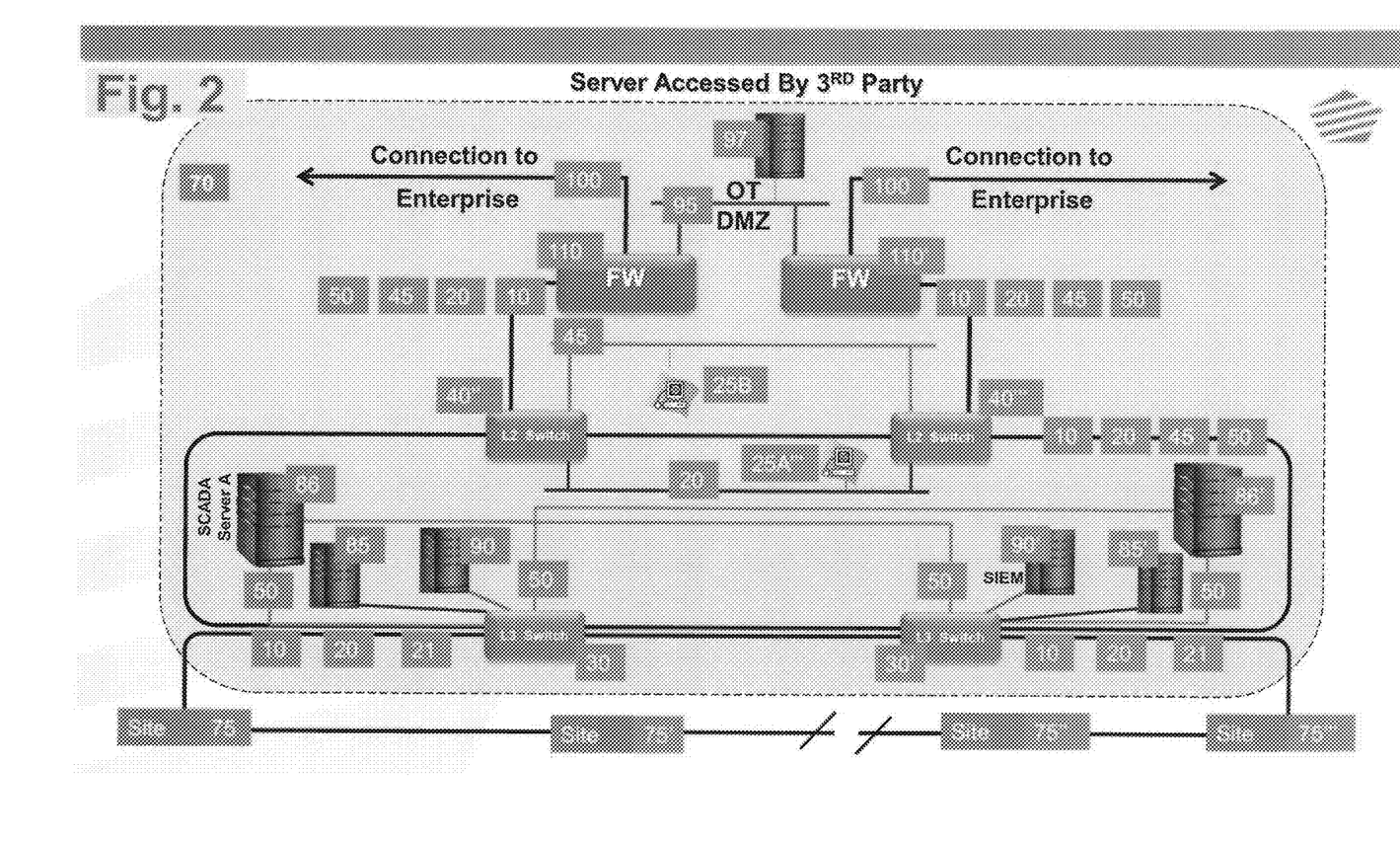
FIG. 2 provides a further preferred embodiment of the present invention.

FIG. 1 illustrates an embodiment of the present invention. FIG. 1 demonstrated a preferred embodiment of the security framework or the present invention. In a preferred embodiment, the use of secure gateway (SG), functional separation (through the use of VLANs as an example), and critical infrastructure IDS sensor and authentication through a centralized or local authentication proxy returning authorization role based attributes. As shown in FIG. 1, there is provided site 75 as an example of a critical infrastructure site. There is also provided site 70 as an example of a control and/or supervision room site. A person skilled in the art will understand that sites 70 and 75 are only used as examples, in an typical critical infrastructure network there may be one or more control rooms and one or more critical infrastructure sites. As shown in FIG. 1 there is provided a representative network 10, VLAN 10 (VLAN Y), used in site 75. It will be understood that site 75 can be a mission critical facility, such a power station. A person skilled in the relevant art will understand that the power station shown as site 75 is merely representative and could be any mission critical infrastructure, including, for example, sub-stations, intelligent transportation systems, rail, traffic control systems, chemical, oil & gas, critical manufacturing, industrial applications, etc. A person skilled in the relevant art will also understand that the use of VLAN as a network segmentation method is just an example; other physical or logical segmentation methods can be used to accomplish the same function. The network 10 has provided a number of devices 15 connected thereto. The devices 15 can include one or more servers, desktop or laptop computers 15B as well as a number of IEDs (15A, 15A', 15A", etc.). As the devices 15 shown in FIG. 1 are connect to the network 10, it will be understood that such devices are part of the protection and/or control network. As shown in FIG. 1, devices 25 are connected to a maintenance network, VLAN 20 (VLAN M) and VLAN M 20, is configured in this example to perform control, operation and/or maintenance functions. FIG. 1. also shows Network 21, VLAN 21 (VLAN G) as an example of a L2 only application VLAN (L2 GOOSE is an example but can be any other application with similar requirements), VLAN G can have devices connected, same or similar to devices 15 (not shown), used for control and/or protection. There can also be any other critical application VLAN facilitating L2 or L3 protocol operation. All critical infrastructure site VLANs are connected to site L2 switch devices 40, where one or more devices can be used to increase network reliability. FIG. 1 also introduces devices 80 as secure gateway (SG) devices. It will be understood that one or more devices can be used in parallel for network reliability and availability reasons, typically a minimum of two devices is a good design practice. The SG devices 80 and 80' are used to introduce the functions of routing, dynamic firewall with applied rules based on RBAC to facilitate secure access based on user credentials. As shown in FIG. 1, there is also provided devices 35 are mission critical grade IDS systems designed to understand and operate in mission critical applications and understand mission critical protocols (i.e. GOOSE, DNP, Modbus, etc), one or more such devices can be used per site for threat and anomaly detection. Devices 25 represent maintenance operators devices that can be connected to the maintenance VLAM M either locally in the site, remotely from another critical site, at the control room or through a secure remote connection logically viewed as connected to the maintenance VLAN M. In a preferred embodiment, devices 25 may be connected to VLAN M 20 and using secure shell ("SSH") network protocol or similar means to authenticate through the SSG 80 to gain IP connectivity to site devices connected to Network 10. As part of the VLAN M, devices 25, in a preferred embodiment, would be considered maintenance laptops or desk top computers and they can be located at a critical infrastructure site, at a remote similar site or at the control room. In a preferred embodiment, devices 25 must not have connectivity to devices 15 or similar connected to any other critical infrastructure site VLAN without authentication and authorization through the SG devices, devices 80. A person skilled in the art will understand that an SSH client refers to a software program which uses the secure shell protocol to connect to a remote device. SSH provides a secure, encrypted method of remotely connecting to a device to access the command line interface ("CLI"), assuming the device's IP address and access credentials are known. In a preferred embodiment, as authentication is completed and dynamic firewall rules are applied to allow IP connectivity to devices 15 or similar, should the authentication and authorization process allow so, devices 25 shall be able to use other applications than SSH to access devices 15 to perform control, operation and/or maintenance tasks.

In a preferred aspect of the present invention, there is also provided additional VLANs, namely an operator network VLAN 45 (VLAN O), a control room network VLAN 50 (VLAN C) and an OT network 95 (see FIG. 2.) which in a preferred embodiment would be used for third part OT access, without exposing VLAN C or other site critical VLAN, through the protection of an additional layer of stateful firewall devices 110 shown in FIG. 2. In a preferred embodiment, VLAN O would be provided in the control room site 70 where control room operations are connected, Preferably VLAN O is separated by routing and/or firewall functions (L3 Switches 30 and 30') from critical infrastructure sites protection, control and/or operation networks excluding maintenance VLAN M. In a preferred embodiment, VLAN C would be where control room servers, SCADA servers and/or other control room critical devices connect, preferably separated by routing and/or firewall functions from VLAN O and by switching and routing from other critical infrastructure site protection, control and/or operation networks excluding maintenance VLAN M. As can be seen in FIG. 1, the VLANs (e.g. functional groups) are distributed within two sites, Site 75 and control room 70 which may be separated by physically (e.g. different locations). Site 75, as provided in FIG. 1. is the location of the IEDs in the critical infrastructure site, such as a power substation site, which may be remote from the control room. The control room 70 is shown in greater detail in FIG. 2. In a preferred embodiment, the control room is where the centralized critical infrastructure protection, control and/or operation servers are located, the control room operators and supervisor and control functions are performed.

Figure 3:
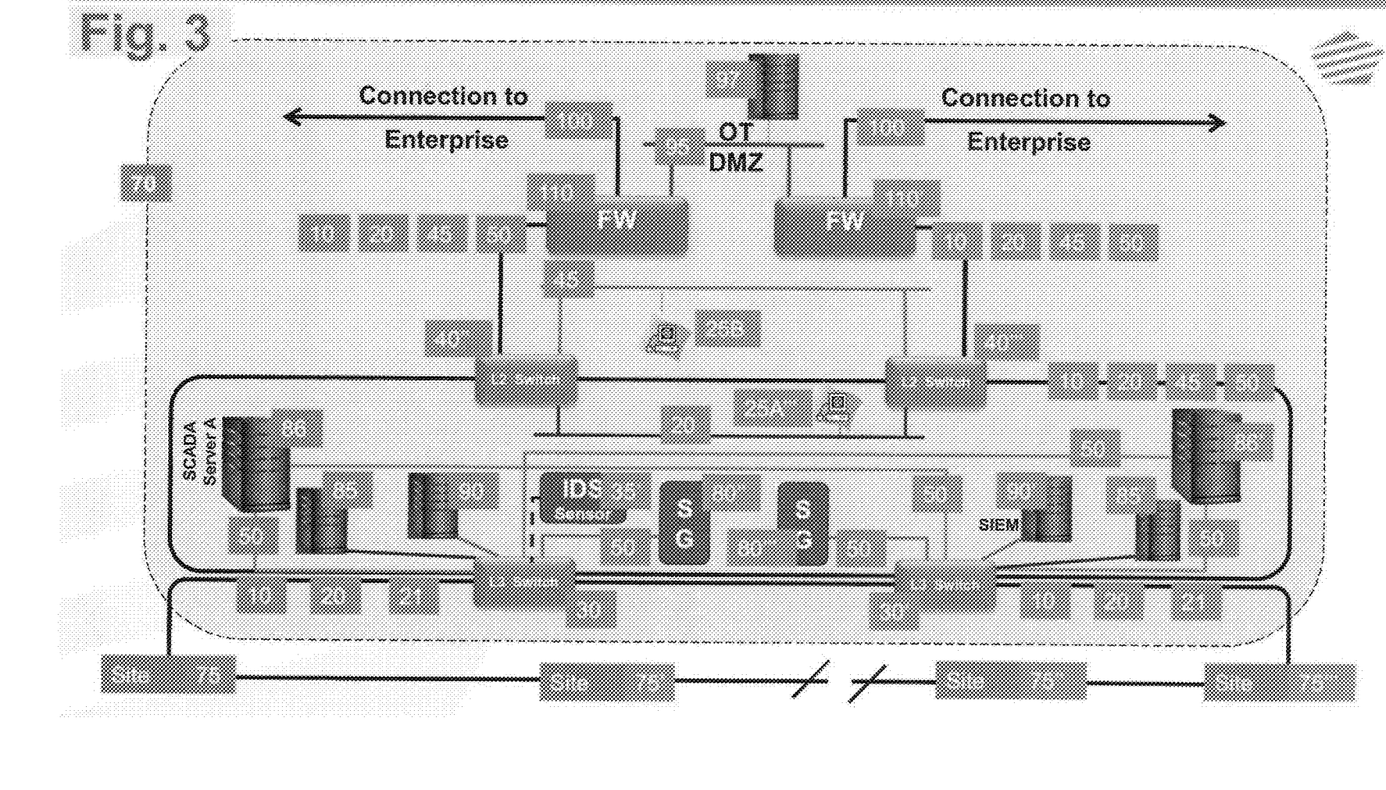
FIG. 3 provides yet a further preferred embodiment of the invention illustrated in FIG. 2.

FIG. 2 illustrates an embodiment of the present invention. FIG. 2 demonstrated the security framework concepts for critical infrastructure applications at the control room level and it includes the introduction of an operator network segment (VLAN O 45) with routing and/or firewall separation from the control room network segment (VLAN C 50) and/or SCADA (VLAN 10), OT DMZ (VLAN 95) to facilitate connections to third parties (e.g. power regulation) and the use of centralized servers, an example, password management server, and/or security information and event management server (SIEM). As shown in FIG. 2, the control room site 70 contains an extension of 75 VLANs 10, 20 and 21 from site 75. It also includes Network 45, VLAN O and Network 50, VLAN C. A person skilled in the art will understand that VLANs are used as means of network segmentation and any similar method can be used to accomplish the same type of network segmentation should be appropriate and considered as part of the current invention. A person skilled in the art will also understand that VLANs 10, 20, 21, 45 and 50 are used as examples; more VLANs can be included as more applications are found to be required or further segmentation is needed. Further segmentation can be achieved for the same functional group based on geographical regions or other means creating of separate instances of the same functional group referred to as VLAN Islands, representing the same functional VLAN, such as, for example, SCADA (known as SCADA Islands) yet with multiple instances, each one with a different VLAN number as if segmented into an island. FIG. 1 also shows L2 switches 40 at the control room, 40" & 40''', control room statefull firewall devices 110, control room L3 devices 30, control room SCADA server devices 86, control room SIEM devices 90, control room OT third party accessible server 97 and control room authentication and authorization password management server devices 85. A person skilled in the art will understand the use or one, or two devices of a kind on the diagram is only representative, for reliability and availability reasons less/more than two devices may be used. FIG. 2 also shows device 25B as control room operator and device 25A as maintenance user. FIG. 3 illustrates an embodiment of the present invention. FIG. 3 shows a similar embodiment to that provided in FIG. 2 with the additional devices 80 and 35 previously described. In a preferred embodiment, the addition of such devices can be used to further protect access to control room critical servers same as illustrated in sites 75.

In a preferred embodiment, the SG devices 80 would control access to IED 15A and critical site servers 15B, (85 and 85') through the use of dynamic firewall rules applied based on successful authentication and authorization using a database holding user credential (provide on server, 85 and 85'). The user management database can be held locally at the device (80 and 80') or remotely at a centralized server, typically in the control room, servers 85. Should a remote centralized server be used the SG devices perform a function called authentication proxy AP, a person skilled in the art will understand AP as receiving user credentials, relaying them to an authentication server, receiving response back from the server including parameters defining the user access privilege level based on their role, those parameters are often called attributes. A person skilled in the relevant art would also understand that the term SG may refer to the software or hardware applications/devices that provide secure communication.

In a mission critical location, such as a the power station 75 of FIG. 1, a user may wish to access one of the IEDs 15A, 15A', 15A", etc. provided in FIG. 1. In order to access IEDs or critical servers Devices 15, for example, a user will need to connect to the maintenance VLAN M and may choose to be physically located within Site 75 (see 25A) or remotely in another critical infrastructure site or the control room therefrom (see 25A' or 25A"). When a user has requested access to the one or more of the devices 15, it communicates the request through the SG, which either performs local authentication and authorization or use the AP function to validate credential through centralized user management servers 85 and/or 85', depending on the SG devices configuration (Local authentication or AP mode) as explained earlier. As authentication successfully completed either with grant or denial of access, the SG dynamically apply firewall rules to grant the user 25A, 25A' or 25A" access to IED/s based on returned authentication attributes upon which the devices 25A can start using other authorized applications to communicate directly with devices 15.

As shown in FIG. 1, the authentication proxy of devices 80 then can respond with an authentication acceptance or rejection depending on the authentication profile of the user based on the identification, validation and authorization of the user credentials through the use of a centralized password management platform provided in authentication servers 85. Firewall rules are dynamically applied to allow user access based on the attributes returned by the centralized password management server upon successful authentication and authorization as provided by the authentication servers 85. A person skilled in the art will understand that the methods and processes of the authentication servers would be well known. Based on the response and the authorization privileges of the user, the user can access the IEDs from the access point 15A'.

As part of the current invention, in a preferred embodiment, OT third part can be granted through the use OT DMZ servers, which can contain so subset of SCADA, meeting and other servers as needed. The OT DMZ is separated from the critical OT operation through a statefull firewall reducing any possible exposure on control systems. Third party users will need to access the enterprise network through the enterprise firewall, then go through a second level of firewall described in FIG. 2 as devices 110 before accessing OT DMZ servers. OT DMZ servers are separated from critical operation through the firewall devices 110.

Although this disclosure has described and illustrated certain preferred embodiments. As shown in FIG. 1, in a second situation, of the invention, it may be to be understood that the invention may be not restricted to those particular embodiments. Rather, the invention includes all embodiments which are functional or mechanical equivalence of the specific embodiments and features that have been described and illustrated.

We claim:

1. A system for an end-to-end security framework in a mission critical infrastructure site, the system comprising:
    (a) an L3 level network partitioned into a plurality of L2 level networks based on functional purpose and connected through a plurality of firewall devices;
    (b) a control device provided in the mission critical infrastructure site connected to one of the plurality of L2 level networks;
    (c) an input device connected to one of the plurality of L2 level networks for allowing a user to request access to the control device by inputting user information into the input device;
    (d) a secure gateway device with dynamic firewall function managing access between the input device and the control device through applying dynamic firewall rules;

(e) a credential management application connected to at least one of the plurality L2 networks having a role based access control protocol for granting access to the control device by analyzing the user information; and (f) whereby the user can be granted access to the control device based on the analysis of the user information by the role based access control protocol of the credential management application.

2. The system of claim 1 wherein the secure gateway device is located in the mission critical infrastructure site.

3. The system of claim 1 wherein the secure gateway device is located remote from the mission critical infrastructure site.

4. The system of claim 1 wherein the credential management application is located in the mission critical infrastructure site.

5. The system of claim 1 wherein the credential management application is located remote from the mission critical infrastructure site.

6. An end-to-end security framework for a mission critical infrastructure having plurality of sites, the framework comprising:

(a) a L3 level network partitioned into a plurality of L2 level networks, (b) a plurality of intelligent electronic devices connected through one of a plurality of L2 level networks to form a plurality of functional groups across the plurality of sites, at least one device being accessible to a user and at least one device being a secure gateway, wherein L2 connectivity between the plurality of the intelligent electronic devices within the same functional group is maintained across sites to accommodate critical infrastructure L2 protocol communications requirements and non-L3 critical infrastructure communication protocols yet restricting access through a role based authentication control protocol, (c) an input device connected to one of the plurality of the L2 level networks for allowing a user to request access to the control device by inputting user information into the input device;

(d) a secure gateway device connected to one of the plurality of the L2 level networks for control access between the input device and the plurality of intelligent electronic devices, (e) a credential management application connected to one of the plurality of the L2 level networks having a role based access control (RBAC) protocol for granting access to each of the plurality of intelligent electronic devices by analyzing the user information; and (f) whereby the user can be granted access to each of the plurality of intelligent electronic devices based on the analysis of the user information by the role based access control protocol of the credential management application.

7. The framework of claim 6 wherein each of the plurality of intelligent electronic devices are grouped based on functional purpose and connected through the secure gateway device.

8. The framework of claim 7 wherein the secure gateway device further comprises an authentication proxy function using role based access control authentication rules used to control access to the plurality of intelligent electronic devices.

9. The framework of claim 6 wherein the functional separation is based on application, control element, user role or managing authority jurisdiction.

10. The framework of claim 9 wherein user access to one of the plurality of intelligent electronic device is restricted across functional groups though access control function using dynamic firewall rules based on user credentials.

11. The framework of claim 10 wherein the L3 level network is part of a critical infrastructure.

12. The framework of claim 11 wherein one of the plurality of sites is a control room.

13. The framework of claim 12 wherein one of the plurality of L2 Level Networks is a SCADA or Operator Network Segment.

14. The framework of claim 13 wherein at least one of the plurality of L2 Level Networks is a SCADA network segment.

15. The framework of claim 13 wherein at least one of the plurality of L2 Level Networks is an Operator Network Segment.

16. The framework of claim 13 wherein the control room is provided with OT DMZ for OT partner access.

17. The framework of claim 13 further comprising a stateful firewall between the SCADA and Operator network segment.

18. The framework of claim 13 wherein the control room further comprises enterprise grade IDS.

19. The framework of claim 13 wherein the plurality of L2 Level Networks further comprise an antivirus, anti-spam or anomaly detection function.

20. The framework of claim 13 wherein the plurality of L2 Level Networks further comprises a SIEM platform for security monitoring.

21. The framework of claim 13 wherein the user authentication is conducted by a fallback mode supported on the secure gateway to facilitate site independent operation requirements for critical infrastructure sites.

22. The framework of claim 21 wherein the secure gateway utilizes dynamic firewall roles applied and removed based on RBAC according to user credentials.

23. The framework of claim 22 wherein a critical infrastructure protocol aware grade IDS monitors security.

24. The framework of claim 22 wherein the plurality of L2 Level Networks further comprises VLANs.

25. The framework of claim 24 wherein logical separation into functional groups uses device MAC address to restrict access to network ports to the specific intended device specially on the SCADA network segment and control room network segment.

26. The framework of claim 25 wherein an unused port on a device is put in disable or shut down mode with the exception of maintenance ports for which the appropriate VLAN needs to be configured for functional separation and maintaining security.

27. The framework of claim 26 wherein a static connection is created across functional groups.

28. The framework of claim 27 wherein the static connection can be accommodated through the use of static client mode.

29. The framework of claim 22 wherein L2 encryption is used between the first and second site while maintaining the L2 connectivity required to support non-L3 critical infrastructure communication protocols.

30. The framework of claim 22 further comprising a plurality of secure gateways to enhance the availability and reliability of the framework.

31. The framework of claim 13 wherein the secure gateways further comprise stateful firewalls to maintain security between the SCADA network segment and Operator network Segment.

32. The framework of claim 31 wherein the stateful firewalls enhance security between SCADA and OT DMZ.

33. The framework of claim 32 further comprising enterprise grade IDS system for anomaly detection and reporting.

34. A method for implementing a security framework for mission critical infrastructure applications maintaining L2 connectivity across infrastructure sites, the method comprising:
- (a) partitioning an L3 level network into a plurality of L2 level networks based on functional purpose and connected through a plurality of firewall devices;
- (b) providing a control device in the mission critical infrastructure site connected to one of the plurality of L2 level networks;
- (c) allowing a user to request access to the control device through an input device connected to one of the plurality of L2 level networks, the user inputting user information into the input device;
- (d) managing access between the input device and the control device through a secure gateway device with dynamic firewall function applying dynamic firewall rules;
- (e) granting access to the control device through a credential management application connected to at least one of the plurality L2 networks analyzing the user information using a role based access control protocol; and
- (f) whereby the user can be granted access to the control device based on the analysis of the user information by the role based access control protocol of the credential management application.

* * * * *